106. COMPOSITIONS,
91 COATING OR PLASTIC.

*1 references* Examiner.

UNITED STATES PATENT OFFICE.

JACOB LAEUFER, OF LIMA, OHIO. 818,833

ARTIFICIAL WOOD OR SUBSTITUTE MATERIAL.

No. 818,833. Specification of Letters Patent. Patented April 24, 1906.

Application filed January 31, 1906. Serial No. 298,862.

*To all whom it may concern:*

Be it known that I, JACOB LAEUFER, a citizen of the United States, residing at Lima, in the county of Allen and State of Ohio, have invented new and useful Improvements in Artificial Wood or Substitute Material, of which the following is a specification.

This invention relates to an artificial wood or substance to serve as a substitute for wood.

This artificial wood or substitute substance is fireproof, a non-conductor of heat or cold, can be rendered practically waterproof under all conditions, is a non-conductor of electricity, and is capable of being cut by the use of a saw or other analogous cutting implement or to receive nails, spikes, or other fastenings with the same holding securely as wood without crumbling, cracking, or otherwise injuring the artificial material. The use of this artificial material is general, but is particularly adapted for lining refrigerators, fence-posts, railroad-ties, and in all places where wood or stone are now used, and one of the main advantages of the improved material is that it stands more pressure to the square inch than either wood or brick. Furthermore, the artificial wood or substitute material or substance for wood and stone in various arts, and embodying the features of the invention, is made up of contituents which can be readily and cheaply obtained, and the several constituents may be economically assembled.

The artificial wood or substitute material consists, essentially, of a resisting element which has the effect to overcome expansion and contraction, a hardening material, and a binder. To these it is proposed to add at times a further element for more positively closing pores, an auxiliary binder, and a waterproof substance, such as oil. It is also intended to coat the artificial wood or substitute material to adapt it for some uses with a composition of creosote and paraffin.

In its simplified form the artificial wood or substitute material is composed of vegetable matter, one pound; Portland cement, two pounds; plaster-of-paris, four ounces; swine blood, quantity sufficient to moisten the remaining ingredients. The vegetable matter may be sawdust, straw, stall residuum or refuse, cornstalks, tan-bark, or other analogous material, which is finely ground and thoroughly mixed with the Portland cement and plaster-of-paris. These three constituents—namely, vegetable matter, Portland cement, and plaster-of-paris—are then moistened with swine blood to a suitable consistency, enough blood being used to arrive at the result sought. This swine blood must also be treated before it is of any value or as effective in its purpose in combination with the remaining constituents. This treatment consists practically in aging the blood, it being stirred rapidly and all the meaty substance removed therefrom. It is then permitted to stand for a suitable length of time and settle and the water drained off, leaving the body of the blood for use in the composition. As is well understood, swine blood carries a particular form of iron in solution, and it is thus rendered effective as a binder for the remaining ingredients.

As above noted, the vegetable matter operates to give the resulting substance a wood-like character with the advantage of the hardening effect produced by the Portland cement and plaster-of-paris and also the additional advantage of resisting expansion and contraction. In some instances one ounce of sulfur is added to the composition to more firmly close the pores to adapt the resulting material or artificial wood for specific uses. In other instances suitable saccharin matter, such as sugar, to the extent of about two ounces is added to the composition to form an auxiliary binder. If the vegetable matter forming one of the main constituents of the compound is made from cornstalks, it is unnecessary to use the sugar, as there is sufficient saccharin matter resident in cornstalks to take the place of sugar.

Though the material containing the main elements or constituents just specified and as being essentially four in number will answer all ordinary purposes and be effective in the production of an artificial wood or substitute substance, it is obvious that various contingencies and conditions may confront the user and manufacturer of the same, and the additional constituents mentioned are to meet these variations. The artificial wood or substitute material will in its simplified form be practically waterproof, and the addition of other waterproofing materials or constituents to increase the density or to close the pores are used simply from a precautionary standpoint. To meet heavy outdoor wearing qualifications—such as railroad-ties, fence-posts, and analogous devices—the completed artificial wood or substitute substance will be coated with a composition of creosote and paraffin in suitable proportions. When oil and sugar are used in the compound, the oil being employed to give the material greater waterproof characteristics, they are mixed with the swine blood and added with the latter to the other ingredients. It will be understood that the substitute material while in a moistened condition may be molded into any shape desired and that suitable molds may be used for giving the same the requisite contour.

The improved material will be found exceptionally useful for all purposes where blood and stone are now employed, and by varying the ingredients or constituents as specified, or, in other words, making additions to the main ingredients the said material will be rendered practical for all uses. It has been found in practice that spikes or nails driven into the material adhere more firmly than in wood, with the additional advantage that there is nothing around the driven part of the spike or nail to rot, and hence such driven devices almost remain in positive application in the said material.

Having thus described the invention, what is claimed as new is—

1. The herein-described substitute material, consisting of vegetable matter, Portland cement, plaster-of-paris, and swine blood, in or about the proportions mentioned.

2. The herein-described material, consisting of vegetable matter, Portland cement, plaster-of-paris, sulfur, and swine blood, in or about the proportions mentioned.

3. The herein-described material, consisting of vegetable matter, Portland cement, plaster-of-paris, sulfur, sugar, and swine blood, in or about the proportions mentioned.

4. The herein-described substitute material, consisting of vegetable matter, Portland cement, plaster-of-paris, oil, and swine blood, in or about the proportions mentioned.

5. The herein-described substitute material, consisting of vegetable matter, Portland cement, plaster-of-paris, sulfur, oil, and swine blood, in or about the proportions mentioned.

In testimony whereof I have hereunto set my hand in presence of two subscribing witnesses.

JACOB LAEUFER.

Witnesses:
JOHN F. NORMAN,
JOHN CRETSINGER.